United States Patent Office 2,870,134
Patented Jan. 20, 1959

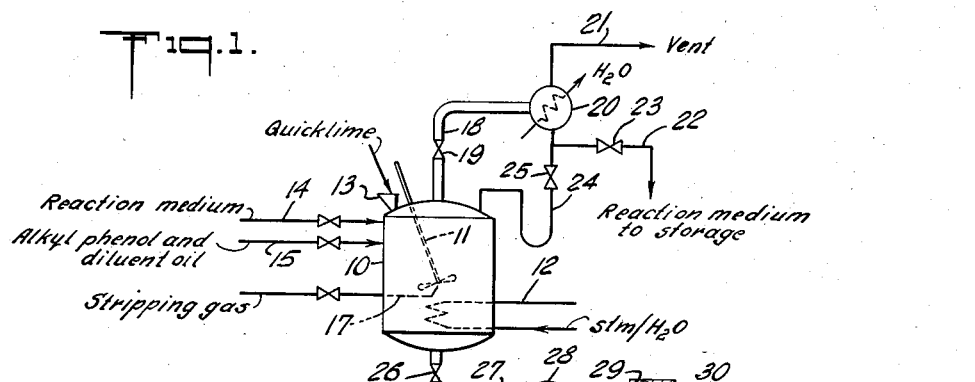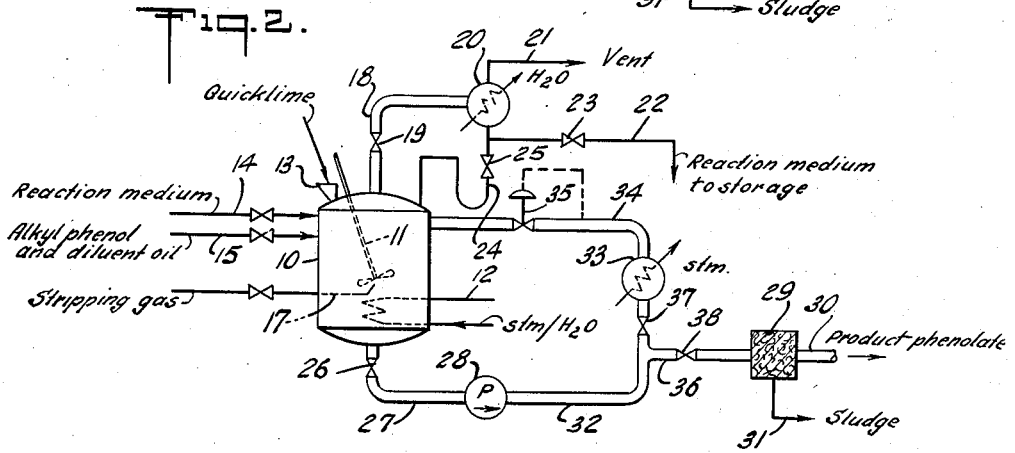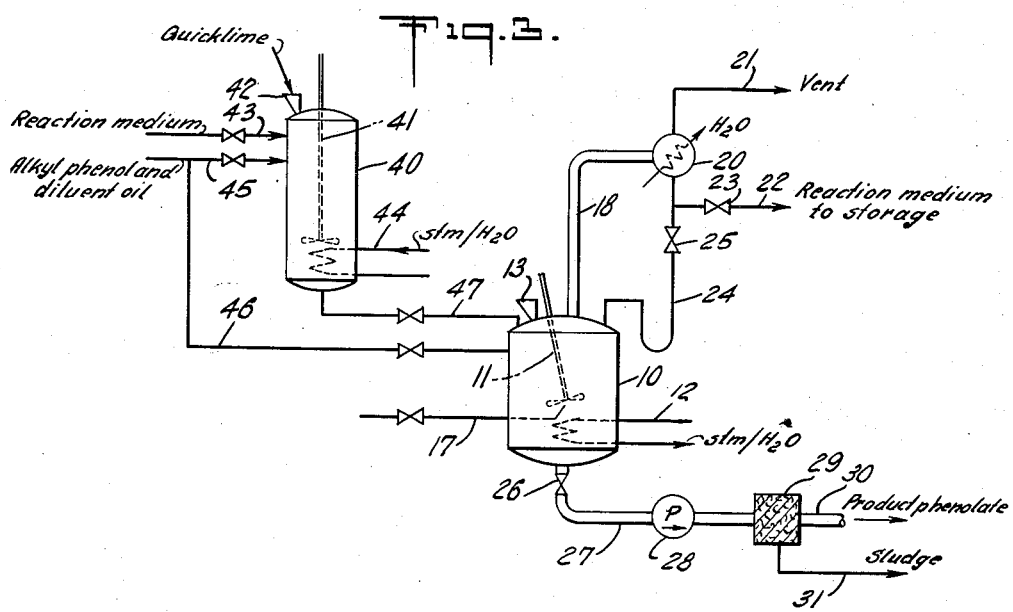

2,870,134

PREPARATION OF CALCIUM PHENOLATES AND SULFURIZED DERIVATIVES THEREOF

Herman D. Kluge, Fishkill, N. Y., and Kenneth Drake, Portland, Maine, assignors to The Texas Company, New York, N. Y., a corporation of Delaware Application December 12, 1956, Serial No. 627,953

18 Claims. (Cl. 260—137)

This invention relates to a process for production of oil-soluble calcium phenolates and sulfurized calcium phenolates, and more particularly to such a process whereby high yields of the desired phenolate product can be made economically on a commercial scale.

Calcium salts of oil-soluble phenols are compounded with lubricating oils and have the property of dispersing sludges and maintaining internal combustion engines clean. Heretofore, attempts to make such calcium salts directly from a suitable phenol and calcium oxide in a monohydric alcohol reaction medium, e. g., ethanol (in the manner of making the corresponding barium compound from the phenol and barium oxide octahydrate), have been generally unsatisfactory. Furthermore, use of a low cost commercial grade of calcium oxide has been considerably less satisfactory than chemically pure calcium oxide for the synthesis.

Accordingly, it has been proposed to react alkali metal phenolates with water-soluble calcium salts such as those of the lower fatty acids in order to make the desired calcium phenolates. Such process is indirect and gives relatively low yields of the desired product. It has been proposed also to react an oil-soluble phenol with an excess of calcium hydroxide or oxide (more than one equivalent of CaO per equivalent of phenol) in a liquid reaction medium of an alkane vicinal diol, e. g., ethylene glycol. However, removal and recovery of the glycol from the reaction product is difficult and generally requires use of very low absolute pressure, e. g., 20 mm. Hg.

Our process is a direct process whereby the yield of the desired phenolate product is very high; whereby commercial grade calcium oxide can be used effectively; and whereby the liquid reaction medium can be removed from the crude phenolate product without resorting to vacuum distillations or other costly techniques.

The product of our process can be either a calcium alkyl phenolate or a sulfurized calcium alkyl phenolate. In the process an excess of the calcium oxide, i. e., more than one equivalent of pulverulent calcium oxide (0.5 mol) per equivalent of the oil-soluble phenol is used in a liquid reaction medium. Our improvement comprises broadly; using as the reaction medium a monohydric alcohol having atmospheric boiling point between about 173° and 340° F.; forming a mixture of said reaction medium and at least the calcium oxide reactant; and maintaining at least a portion of the said mixture at temperature above the atmospheric boiling point of said reaction medium and between about 225° and about 450° F. for a conditioning period of at least about one hour, thereby activating calcium oxide for reaction with the oil-soluble phenol. During the conditioning period any vapors formed are retained in the conditioning zone, i. e., totally condensed and returned if issuing under atmospheric pressure or confined in the conditioning zone if superatmospheric pressure is used.

Our process can be practiced by a number of ways, all of which activate the calcium oxide for reaction with the phenol. In one embodiment eminently suitable for small batches, the alcoholic reaction medium and the calcium oxide reactant are mixed and heated to about reflux temperature of the reaction medium at atmospheric pressure; thereafter the mixture is subjected to alternating intervals of agitation and stagnation, the conditioning period at the elevated temperature being during stagnation. Here the lime, occluding some reaction medium, settles out during the stagnation periods and local overheating of the settled mass occurs. After at least an hour, and preferably 2 to 6 hours, of alternating between agitation and heating periods of about 5 to about 60 minutes on the one hand and stagnating periods of about 5 to about 60 minutes on the other, the phenol is added, and the resulting mixture is refluxed from about 1 to about 4 hours at atmospheric pressure. Then the reaction medium is stripped off, conveniently by distilling in the presence of a sweep of inert gas such as nitrogen or a gas such as carbon dioxide to remove the final traces of the reaction medium, and the stripped product is clarified by separating solid material, e. g., by filtration, centrifuging or the like. Alternatively, this process can be modified by adding the phenol to the reaction medium and calcium oxide, and proceeding with the same sequence of conditioning, refluxing, stripping and clarification as before.

For a larger scale operation, where interruptions in the sequence of operations are less desirable, there are several alternative techniques for activating the calcium oxide. Thus the calcium oxide reactant and reaction medium can be mixed and heated under pressure to a temperature above the atmospheric boiling point of the medium but not substantially in excess of about 450° F. for at least about one hour for conditioning, and preferably from 2 to 6 hours; at the conclusion of said conditioning period the phenol reactant is added, and the resulting mixture refluxed, advantageously at atmospheric pressure for a period of 1 to 4 hours, for efficiency and economy, but also effectively at higher or lower pressure if desired. The reaction medium is stripped from the product as previously described, and solid material is separated from the stripped product as before. This pressure procedure can be modified by blending both the phenol and quicklime reactants with the reaction medium prior to conditioning, then proceeding to operate under autogenous pressure with agitation as before, i. e., conditioning and possibly carrying out at least part of the lime-phenol reaction concurrently, refluxing at atmospheric pressure thereafter to finish the reaction, stripping and clarifying.

Still another attractive alternative comprises activating part of the lime steadily in a blend with the reaction medium, optionally with the phenol also, e. g. by circulating a portion of the mixture for activation from a vessel (maintained at total reflux under atmospheric pressure) through an external circuit maintained at temperature above the atmospheric boiling point of the reaction medium and under sufficient pressure to prevent flashing of the reaction medium, then back to the atmospheric pressure vessel. Here the activation is done incrementally for as long as 8 hours, or longer, only part of the mixture being subjected to temperature above the boiling point of the reaction medium at any one time.

For convenience the activation of the lime and subsequent steps leading to clarification of the product can be done in a single vessel or a series of vessels. Thus activation can be done in one vessel, e. g., a pressure vessel, and the refluxing, and stripping can be done in a second vessel.

The precise mechanism of activation of the lime in our process is not known. We have found no evidence of calcium alcoholate formation in the reaction medium during the conditioning period. Likewise, introduction of air or some acetaldehyde to the mixture for activation to induce aldol or other intermediate formation and possible activation of the lime was unsatisfactory, indicating that such transitory intermediates are not a likely cause for the surprising lime activation.

Temperature measurement of the lime settling out during an atmospheric pressure alternating stirring-stagnating type of lime conditioning is quite difficult. Careful observations lead us to believe that there are hot spots in the settled mass at least several degrees Fahrenheit, e. g., at least about 5° F. and even higher, above the atmospheric boiling point of the reacting medium. For best operation and highest conversion of oil-soluble phenol to calcium phenolate we prefer to activate the lime with the reaction medium above as a separate step in the process.

The drawings are flow diagrams showing several ways for practicing our invention.

Figure 1 shows employment of vessel 10, which is constructed for operation at atmospheric pressure and above, e. g., up to about 1000 p. s. i. g. Vessel 10 is equipped with agitator 11, steam-water temperature control coils 12, solids input hatch 13, reaction medium inlet 14, phenol inlet 15, stripping gas sparger 17, vapor line 18, vapor line shutoff valve 19, condenser 20, vent 21, condenser drawoff line 22 controlled by valve 23, condenser reflux line 24 controlled by valve 25, drain valve 26, outlet line 27, pump 28, filter 29, and product discharge line 30. In one mode of operating this equipment quicklime and the reaction medium are charged to the vessel 10 through inlets 13 and 14, respectively, and heated with agitation to about the atmospheric boiling point of the reaction medium, preferably just below said boiling point. Vessel 10 is vented to atmosphere. Any reaction medium vapors ascend through line 18 and valve 19, are condensed in condenser 20, are returned through line 24 and valve 25 back to the mixture. Agitation is continued for 5 to 30 minutes then stopped; heating steam should also be throttled, or on large batches where heat losses are insignificant, completely shut off to prevent "bumping" of the vessel contents. Lime containing occluded reaction medium settles out.

After a short settling period, preferably about 30 minutes, the agitation and heating are resumed. Alternation of 30-minute agitation and stagnation periods are carried on for 2–6 hours or even longer if desired. Then the requisite amount of suitable oil-soluble phenol, preferably in a vehicle of diluent hydrocarbon oil to render it easy to handle, is added to the reactor through inlet 15. If a sulfurized phenolate is desired, elemental sulfur, approximately from 0.1 to 2 mols (3.2 to 64 pounds) and preferably from 0.5 to 1.25 mols per mol of the calcium oxide (56 pounds) charged can be added to reactor 10 at this stage. Preferably, however, the sulfur is added to and heated at about 275–350° F. with the stripped reaction product at a later stage of the process for about 1–2 hours or more just prior to filtration, hereinafter described. The resulting mixture is held under total reflux for 1 to 10 hours, preferably about 2 to 3 hours, then valve 25 is shut and valve 23 opened, and the reaction medium stripped off, condensed, and withdrawn to storage through line 22. In the final stages of stripping an inert gas is introduced advantageously through sparger 17, then vented from the system through vent 21. After the stripping operation valve 26 is opened, and the product mixture is passed through line 27, pump 28, and into filter 29. Herein solids, chiefly excess lime, are removed and the product thus clarified. The product calcium phenolate is withdrawn through line 30 and the lime sludge through line 31.

In a variation of the above procedure the reaction medium, quicklime, and phenol are all charged together into vessel 10, mixed, and heated, and subjected to alternating intervals of agitation and stagnation at atmospheric pressure as before. After such conditioning the stripping and clarification is carried out in identical manner. If a sulfurized phenolate is desired, elemental sulfur can be added to the reactor as outlined heretofore.

The apparatus in Figure 1 is also adapted to superatmospheric pressure operation for the lime conditioning. In one modification of such pressure operation the lime and reaction medium are charged to reactor 10 through inlets 13 and 14, respectively. The reactor is sealed, and valve 19 is closed. Agitation is begun, and the slurry of lime in the reaction medium is heated to temperature above the atmospheric boiling point of the reaction medium, e. g., 10–125° F. or more thereabove but not in excess of about 400–450° F. whereby the pressure in the reactor will be between about 2 and about 750 p. s. i. g. The agitated mass is maintained at the elevated temperature and autogenous pressure for at least about 1 hour, and preferably 2 to 8 hours, then cooled to about the atmospheric boiling point of the reaction medium. Valve 19 is opened and the phenol reactant is added through inlet 15. Refluxing, stripping, and clarification are then conducted as previously described with this equipment. If a sulfurized phenolate is desired, the elemental sulfur can be added to vessel 10 when the phenol is added, or, preferably, added to and heated with the stripped reaction product for about an hour or more just before clarification as outlined hereinbefore.

A further modification in the operation of the apparatus shown in Figure 1 comprises adding the lime, the reaction medium, and the phenol reactant together and along with sulfur if desired, agitating the mixture, and heating it up to desired temperature above the atmospheric boiling point of the reaction medium with valve 19 closed. After such conditioning period the material in vessel 10 is cooled, refluxed at atmospheric pressure, stripped of reaction medium, and clarified as previously described.

Figure 2 shows another way in which our invention can be practiced whereby vessel 10, with previously enumerated auxiliary equipment, is further equipped from the pump discharge with a line 32 for an external pressure circuit comprising valve 37, heater 33, heater discharge 34, and back pressure control valve 35 (which discharges back to vessel 10). In the operation shown here, the reaction medium and quicklime are added as before through inlets 13 and 14, respectively, and mixed while being heated to approximately the boiling point of the reaction medium. A suspension of lime in reaction medium is constantly withdrawn through valve 26 and line 27 into pump 28, then discharged through line 32, valve 37, heater 33, heater discharge 34, back pressure control valve 35 on the external circuit, and back to vessel 10. Back pressure control valve 35 is set to maintain the reaction medium in liquid state passing through heater 33 wherein the slurry is heated to temperature above the atmospheric boiling point of the reaction medium but not substantially above about 400–450° F. During this circulation and conditioning period valve 38 is closed.

After at least one hour and preferably 2–8 or more hours of conditioning of the quicklime in this manner the phenol, suitably in a vehicle of diluent mineral oil, is added through line 15. The resulting mixture is refluxed at atmospheric pressure with the reaction medium vapors ascending line 18 through valve 19, being condensed in condenser 20, and refluxed to vessel 10 through line 24 and valve 25. During this period, circulation of the contents of vessel 10 can be maintained on the external circuit through heater 33 and back pressure controller 35, if desired. After 1–10 hours refluxing, the reaction medium is stripped from the mixture, condensed, and withdrawn to storage through line 22 and valve 23. The final traces of reaction medium can be removed with the assistance of stripping gas entering sparger 17 and being vented through vent 21.

When the desired amount of stripping has been accomplished, the crude product is passed through valve 26, line 27, pump 28, pump discharge line 32, bleed 36, valve 38, and into filter 29. Clarified calcium phenolate product is withdrawn through line 30 and lime sludge through line 31. This operation scheme can also be modified to add the phenol reactant together with the reaction medium and quicklime at the beginning of the conditioning period. The product can be sulfurized as previously described.

Figure 3 shows a method whereby refluxing and stripping is done in a vessel distinct from the conditioning. Herein quicklime and reaction medium are charged into pressure vessel 40 by means of inlets 42 and 43. The phenol reactant and diluent oil, and elemental slufur, if a sulfurized phenolate is desired, can also be charged into vessel 40 at this stage, the sulfur through inlet 42 and the phenol through inlet 45. Preferably, however, the stripped calcium phenolate reaction product is sulfurized before clarification as previously described. The mixture in vessel 40 is stirred by agitator 41 and the temperature is controlled by coils 44. The contents of vessel 40 are maintained under autogenous pressure at temperature above the atmospheric boiling point of the reaction medium but below 400–450° F. for at least about an hour, then cooled to about the atmospheric boiling point of the reaction medium.

The contents of vessel 40 are then withdrawn through drain 47 and passed into vessel 10. If, in the preceding high pressure stage part or all of the phenol reactant, or phenol reactant and sulfur, had been added, no further additions are made to the mixture in vessel 10. If, however, the conditioning was conducted solely with the quicklime and reaction medium, then the phenol reactant is added through inlet 46 and elemental sulfur through inlet 13 (should sulfuriation be desired at this or a later stage of operation). The contents of vessel 10 are agitated as before by agitator 11 and heated by coils 12 to maintain a total reflux of reaction medium at atmospheric pressure for about 1 to about 4 hours, then the reaction medium is stripped off through condenser 20 and line 22, and sent to storage. The entire stripping or the last stages thereof are assisted by admission of inert gas through sparger 17. When the desired degree of stripping has been attained, the stripped reaction product is passed through valve 26, line 27, and pump 28 into filter 29. Clarified product phenolate, or sulfuried phenolate as the case may be, is withdrawn through line 30 while lime sludge is withdrawn through line 31.

Advantageously, the temperature above the atmospheric boiling point of the reaction medium during the conditioning period of our process is between about 225° F. and about 450° F., and preferably it is between about 256–275° F. and about 400° F., the higher temperatures being available by use of superatmospheric pressure operation.

While the lower monohydric alkanols and alkoxyethanols having an atmospheric boiling point between about 173° and about 340° F. and molecular weight between about 46 and about 120 are effective reaction mediums in the lime activation step of our process, we have found it advantageous, for obtaining superior conversion of the oil-soluble phenol to calcium phenolate, to use the alkanols and alkoxyethanols having boiling point above about 180° F. Such reaction mediums include 2-methoxyethanol-1, 2-ethoxyethanol-1, 2-butoxyethanol-1, and $C_3$–$C_6$ alkanols. The lower alkanols having atmospheric boiling point below about 225°–250° F. generally require superatmospheric pressure operation rather than alternating intervals of stagnation and agitation at atmospheric pressure during the conditioning periods to exert their greatest effect for our purpose.

The preferred reaction mediums which combine high conversion of the oil-soluble phenol to calcium phenolate, ease of removal from reaction mixture, and generation of only moderate pressure during the conditioning period should pressure operation be used are the 3–4 carbon alkoxyethanols, 2-ethoxyethanol-1, i. e., "Cellosolve," and 2-methoxyethanol-1, i. e., "methyl Cellosolve."

The amount of medium for activation of the lime should be at least about 1.5 lbs. per pound of the CaO charged, advantageously 2.5–10 lbs. per pound of the CaO charged, and preferably between about 2.8 and about 4.5 lbs. per pound of the CaO charged.

While pure or substantially pure calcium oxide can be used in the practice of our process, for economy we prefer to use a finely-ground commercial grade of calcium oxide or high calcium quicklime, e. g., one having about 93–99+% calcium oxide and a balance of magnesium oxide, silica, iron oxide, alumina, and small amounts of carbonate and water. The quantity of calcium oxide used should be broadly about 0.75 to 10 and is preferably 1 to 2 mols per equivalent of the phenol used for the highest yield of product. Stated conversely, these proportions are broadly 0.1–1.33 and preferably 0.5–1 equivalent of phenol per mol of calcium oxide charged.

The method of this invention is particularly suitable for the preparation of calcium salts (and corresponding sulfurized calcium salts) of oil-soluble phenols containing up to 5, and especially 1 to 3 straight chain or branch chain saturated or unsaturated, essentially hydrocarbonaceous radicals attached to the benzene ring, each radical preferably having from 4 to 60 carbon atoms. Examples of suitable hydrocarbonaceous radicals include alkyl radicals such as butyl, hexyl, octyl, decyl, dodecyl, hexadecyl, eicosyl, and triacontyl radicals; radicals derived from petroleum hydrocarbons such as white oil, wax, olefin polymers such as polypropylene and polybutylene and the like; cyclic non-benzenoid radicals such as cyclohexyl, bornyl, and the like; alkoxy radicals such as pentoxy, octoxy, and cetoxy radicals, and so forth.

Specific phenols include; butyl phenol, amyl phenol, hexyl phenol, octyl phenol, hexadecyl phenol, dibutyl phenol, dioctyl phenol, dinonylphenol, dihexadecyl phenol, dioctadecyl phenol, tributyl phenol, tri-octadecyl phenol, eicosyl phenol, triacontyl phenol; alkyl phenols wherein the alkyl groups are derived from alkylene polymers; pentoxy phenol, octoxy phenol, meta-, ortho- and para-cetoxy phenols, and so forth. Likewise, phenol sulfides such as dialkyl phenol sulfides or polysulfides, e. g., diamyl phenol sulfide or mixtures thereof with alkyl phenols, can also be employed. Also phenols coupled, e. g., those of the structures:

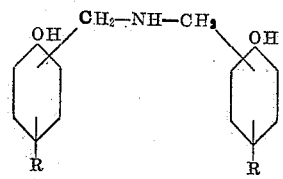

or

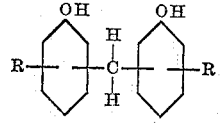

or

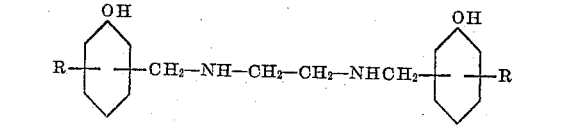

wherein the R groups are $C_4$ or higher, can also be used as the oil-soluble phenol reactant. An equivalent of monohydric phenol is, of course, a mol of that phenol;

and an equivalent of a polyhydric phenol is the quotient of its mol weight divided by the number of phenolic hydroxyl groups. By the foregoing term "essentially hydrocarbonaceous," we mean radicals which are composed mainly of hydrocarbon and include radicals which contain, in addition, minor amounts of substituents such as chlorine, bromine, oxygen, sulfur, nitrogen, etc. which do not substantially affect their hydrocarbon character.

The following examples show various ways in which our invention has been practiced but are not to be construed as limiting the invention. All parts specified are parts by weight unless otherwise noted, all percentages are weight percentages, and all temperatures are in degrees Fahrenheit.

*Example 1.*—56 parts (one mol) of a commercial grade of calcium oxide (having approximate analysis in weight percentage of 67.3 calcium, 0.79 magnesium, 0.20 iron, 0.4 silicon, and 3.3% loss on heating to 1800° F.), and 186.2 parts of 2-ethoxyethanol-1 were heated in a well insulated vessel under atmospheric pressure with agitation to about refluxing temperature. The heat and stirring were turned off for 30 minutes, then both were turned on again for 30 minutes. This sequence then repeated 4 times, giving a 2-hour conditioning period. At the end of this period, 144 parts (0.5 equivalent) of alkyl phenol (made by alkylating benzene with $C_{10}$+propylene polymer) in a solvent vehicle of 144 parts of a hydrocarbon oil having SSU viscosity at 100° F. between 96 and 104, API gravity between 27° and 30°, and minimum flash point (C. O. C.) of 350° F. was blended with the previous mixture. The resulting mixture was stirred and refluxed for 2 hours, then the reaction medium was distilled off with the assistance of a sweep of nitrogen gas into the reaction mixture. Stripping of reaction medium continued as the temperature in the reaction vessel reached 347° F., and the temperature was maintained there as the nitrogen flow was continued for another 3 hours. The so-stripped mixture was filtered. Conversion of the phenol to normal calcium alkyl phenolate was 95.2%.

By the way of contrast when the same procedure and same kinds of materials were used, except that the calcium oxide and the ethoxyethanol were simply refluxed at atmospheric pressure with stirring for 4 hours instead of alternately stirring and stagnating, the conversion of the phenol to the corresponding normal calcium phenolate was considerably lower.

*Example 2.*—The same kinds of materials and proportions as used in Example 1 were charged all together to a well insulated reactor and heated to incipient refluxing temperature under atmospheric pressure. The heat and stirrer were turned off for 30 minutes, then both turned on again for 30 minutes. This sequence of alternate agitation and stagnation was repeated 4 times for a total conditioning period of 2 hours, whereafter the reaction vehicle was stripped off and the stripped product filtered as described in Example 1. Conversion of the phenol to the corresponding normal calcium alkyl phenolate was 78.6%.

By way of contrast, when the same kind of materials in the same proportions were added together and refluxed at atmospheric pressure continuously for 4 hours, then stripped of reaction medium and filtered, conversion of the phenol to the corresponding normal calcium alkyl phenolate was only 23.5%.

*Example 3.*—In this operation the same kinds of materials were used in the same proportions as in Example 1. The CaO and reaction vehicle were held under autogenous pressure in an agitated vessel for 5 hours and 40 minutes at temperature between 300–355° F. This initial mixture was cooled and transferred to an atmospheric pressure reactor wherein the alkyl phenol and mineral oil were added. The resulting mixture was refluxed for 2 hours, then stripped of reaction medium with the assistance of nitrogen blowing until a temperature of 347° F. was reached. Nitrogen blowing was continued for 3 hours, then the stripped product was filtered. Conversion of the phenol to the corresponding normal calcium alkyl phenolate was 98%.

*Example 4.*—In this operation the calcium oxide and hydrocarbon oil diluent were the same kinds as those used in Example 1. 112 parts of the calcium oxide and 326 parts of normal amyl alcohol were charged into an agitated pressure vessel and heated therein to temperature from 350–400° F. for 4 hours, the pressure being between 100 and 150 p. s. i. g. The mixture was then cooled to the room temperature and added to 144 parts of $C_{10}$ + monoalkyl phenol (0.513 mol) dissolved in 144 parts of the hydrocarbon oil. The resulting mixture was refluxed at atmospheric pressure for 2 hours, then the reaction vehicle was distilled off with the assistance of a sweep of nitrogen gas into the reaction mixture. Stripping of the reaction medium continued until the temperature in the reaction vessel reached 347° F., then because the product was very viscous, an additional amount of 144 parts of the hydrocarbon oil diluent was then added. Temperature was maintained at 347° F. for 4 hours while stripping with nitrogen blowing was continued. The stripped mixture was filtered. Conversion of the phenol to normal calcium alkyl phenolate was 79%.

*Example 5.*—In this operation the same kinds of calcium oxide, and hydrocarbon oil diluent as in Example 1 were used, and in the same proportions as in Example 1. The calcium oxide and 193 parts of 2-methoxyethanol-1 were heated in a well insulated reactor under atmospheric pressure with agitation to about refluxing temperature. The heat and stirring were turned off for 30 minutes, then both turned on again for 30 minutes. This sequence was then repeated 4 times, giving a 2-hour conditioning period. At the end of this period the alkyl phenol and hpdrocarbon oil diluent was blended with the previous mixture. The resulting mixture was stirred and refluxed for 2 hours, then the reaction medium was distilled with the assistance of a sweep of nitrogen gas into the reaction mixture. Stripping of reaction medium continued as the temperature in the reaction vessel reached 347° F., and the temperature was maintained there as the nitrogen flow was continued for another 3 hours. The so-stripped mixture was then filtered. Sulfated ash of the filtered product was 126% of that of an equal weight of the corresponding normal calcium alkyl phenolate, indicating that a considerable proportion of "basic" phenolate was made in the above operation.

*Example 6.*—In this operation, the calcium oxide and the hydrocarbon oil diluent were the same kinds as those used in Example 1. 560 parts of the calcium oxide and 1862 parts of 2-ethoxyethanol-1 were maintained for 4 hours at reflux temperature with alternating 30-minute periods of agitated heating and settling without agitation and no heat input. 1440 parts (5 equivalents) of $C_{10}$+ monoalkyl phenol diluted with 1440 parts of oil was then added, the resulting mixture heated to reflux temperature at atmospheric pressure, and then refluxed for 2 hours. The reaction medium was distilled off with the assistance of a sweep of nitrogen gas into the reaction mixture. Stripping of reaction medium continued as the temperature in the reaction vessel reached 347° F. and the temperature was maintained there as the nitrogen flow was continued, giving in all a 3-hour stripping period. The stripped resulting mixture was allowed to cool overnight, then reheated with 80 parts (2.5 mols) of sulfur flowers to a temperature of 302° F. with nitrogen blowing, the effective sulfurizing period lasting 1–2 hours. The sulfurized mixture was filtered. The sulfated ash amounted to 112% of that expected for the corresponding sulfurized normal alkyl phenolate.

*Example 7.*—In this operation the same kinds of quicklime, hydrocarbon oil diluent, and oil soluble phenol as shown in Example 1 were used. 112 parts (2 mols) of the lime and 361 parts of 2-butoxyethanol-1 were heated to reflux with stirring. Then, for the next two hours, 30-minute intervals of agitation with heating to temperature of about 320° F. were alternated with 30-minute intervals when there was no stirring. Following this conditioning period 140 parts (0.5 mol) of the alkyl phenol and 140 parts of hydrocarbon oil diluent were added. The resulting mixture was refluxed for two hours. The mixture was then stripped at elevated temperature to remove the reaction medium, and the stripped mixture was filtered. Sulfated ash found for the filtered product was 134% of that for a corresponding weight of the normal calcium alkyl phenolate, indicating that a considerable proportion of "basic" phenolate was made in the above operation.

*Example 8.*—In this operation the hydrocarbon oil diluent, the calcium oxide, and the alcoholic reaction medium used were the same kinds as used in Example 1. The oil soluble phenol used was a coupled phenol made by reacting an alkyl phenol and hexamethylenetetramine to give bis(2-hydroxy-5-alkylbenzyl)amine,

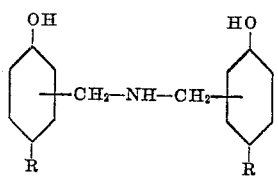

wherein the alkyl (R) groups were from $C_{10}+$ propylene polymer. 28 parts (0.5 mol) of the lime and 93.1 parts of the reaction medium were heated to reflux with stirring. The heat and stirring were suspended for 30 minutes and resumed for the next 30 minutes in a sequence lasting four hours. 301 parts of a 24% by weight concentrate of the oil soluble phenol in the hydrocarbon oil diluent (0.125 mol of the coupled phenol) was then added and the resulting mixture refluxed for two hours. The reaction medium was distilled off with the assistance of a sweep of nitrogen gas into the reaction mixture. Stripping of reaction medium conducted as the temperature in the reaction vessel reached 347° F. This temperature was maintained as the nitrogen flow was continued for another three hours. The so-stripped mixture was filtered. Sulfated ash of the filtered product was 114.5% of that calculated for an equal weight of the corresponding normal calcium phenolate product, indicating that a considerable proportion of "basic" phenolate was made in the above operation. Also indicative of this conclusion was the finding of 0.47% nitrogen in the product whereas nitrogen calculated for an equal weight of the corresponding normal calcium product is 0.57%.

We claim:

1. In a process for production of calcium phenolate and sulfurized calcium phenolate wherein a liquid reaction medium is used and the reactants include an oil-soluble phenol and at least one equivalent of pulverulent calcium oxide per equivalent of the phenol, the improvement which comprises: using as the reaction medium a monohydric alcohol having atmospheric boiling point between about 173° and about 340° F.; forming a mixture of said reaction medium and at least the calcium oxide reactant; and maintaining said mixture at temperature above the atmospheric boiling point of said reaction medium and between about 225° and about 450° F. for a period of at least about an hour, thereby activating calcium oxide for reaction with the phenol.

2. The process of claim 1 wherein said reaction medium is a lower alkoxyethanol of 3–4 carbon atoms, and said period is 2–8 hours.

3. The process of claim 1 wherein said reaction medium is 2-ethoxyethanol-1 and said period is 2–8 hours.

4. The process of claim 1 wherein said reaction medium is 2-ethoxyethanol-1 and said period is 2–8 hours.

5. The process of claim 1 wherein the calcium oxide used is a commercial grade.

6. The process of claim 1 wherein the reaction medium is 2-butoxyethanol-1, and said period is 2–8 hours.

7. The process of claim 1 wherein the reaction medium is a $C_3$–$C_6$ alkanol, and said period is 2–8 hours.

8. The process of claim 1 wherein said mixture is subjected at atmospheric pressure to alternating intervals of agitation and stagnation during said period whereby lime settles out periodically.

9. The process of claim 8 wherein said mixture consists essentially of said reaction medium and calcium oxide, and the phenol is added at the conclusion of said period.

10. The process of claim 8 wherein said mixture comprises said reaction medium, calcium oxide, and the phenol.

11. The process of claim 1 wherein said mixture is maintained with agitation under essentially autogenous pressure during said period.

12. The process of claim 11 wherein said mixture consists essentially of said reaction medium and calcium oxide, and the phenol is added at the conclusion of said period.

13. The process of claim 11 wherein said mixture comprises said reaction medium, calcium oxide, and the phenol.

14. A process for production of calcium phenolate which comprises forming a mixture of a monohydric alcohol having atmospheric boiling point between about 173° and about 340° F. as the reaction medium and a commercial grade of pulverulent calcium oxide in a ratio of 2.5–10 pounds of reaction medium per pound of calcium oxide, maintaining said mixture at temperature above the atmospheric boiling point of said reaction medium and between about 225° and about 450° F. for 2 to 8 hours, thereafter adding 0.1 to 1.33 equivalents of an oil soluble phenol per mol of calcium oxide charged, refluxing the resulting mixture for about 1 to about 4 hours, stripping off said reaction medium from the resulting mixture, and separating solid material from the stripped resulting mixture.

15. The process of claim 14 wherein the reaction medium is a lower alkoxyethanol of 3–4 carbon atoms.

16. A process for production of sulfurized calcium phenolate which comprises forming a mixture of a monohydric alcohol having atmospheric boiling point between about 173° and about 340° F. and a commercial grade of pulverulent calcium oxide in a ratio of 2.5–10 pounds of reaction medium per pound of calcium oxide, maintaining said mixture at temperature above the atmospheric boiling point of said reaction medium and between about 225° and about 450° F. for 2 to 8 hours, thereafter adding 0.1 to 1.33 equivalent of an oil soluble phenol per mol of calcium oxide charged, refluxing the resulting mixture for about 1 to about 4 hours, stripping off said reaction medium from the resulting mixture, adding from 0.1 to 2 mols of sulfur per mol of lime charged, heating the stripped resulting mixture and sulfur at about 275–350° F. for 1–2 hours, and separating solid material from the resulting sulfurized phenolate.

17. The process of claim 16 wherein the reaction medium is a lower alkoxyethanol of 3–4 carbon atoms.

18. In a process for production of calcium phenolate wherein a liquid reaction medium is used and the reactants include an oil-soluble phenol and at least one equivalent of pulverulent calcium oxide per equivalent of the phenol, the improvement which comprises: using as the reaction medium a monohydric alcohol having an atmospheric boiling point between about 173° and about 340° F.; forming a mixture of said reaction medium and at least the calcium oxide reactant; and maintaining said mixture at atmospheric pressure at a temperature above the atmospheric boiling point of said reaction medium and between about 225° and about 450° F. for a period of at least about an hour and subjecting the heated mixture to alternating intervals of agitation and stagnation during said period, thereby activating calcium oxide for reaction with the phenol.

References Cited in the file of this patent

UNITED STATES PATENTS

| | | |
|---|---|---|
| 2,480,664 | McNab et al. | Aug. 30, 1949 |
| 2,680,097 | Stewart | June 1, 1954 |
| 2,781,403 | Kane et al. | Feb. 12, 1957 |
| 2,800,451 | Mottern et al. | July 23, 1957 |

UNITED STATES PATENT OFFICE
CERTIFICATE OF CORRECTION

Patent No. 2,870,134 January 20, 1959

Herman D. Kluge et al.

It is hereby certified that error appears in the printed specification of the above numbered patent requiring correction and that the said Letters Patent should read as corrected below.

Column 5, line 14, for "slufur" read -- sulfur --; line 35, for "sulfuriation" read -- sulfurization --; line 46, for "sulfuried" read -- sulfurized --; column 9, line 73, for "2-ethoxyethanol-1" read -- 2-methoxyethanol-1 --.

Signed and sealed this 12th day of May 1959.

(SEAL)
Attest:

KARL H. AXLINE
Attesting Officer

ROBERT C. WATSON
Commissioner of Patents